United States Patent Office 3,409,458
Patented Nov. 5, 1968

3,409,458
PROCESS FOR PREPARING NUCLEATED FRIT AND WHITE-ENAMELED CAST IRON BODIES PREPARED FROM SAID FRIT
George Henry Spencer-Strong, Baltimore, and Howard J. Smith, Timonium, Md., assignors, by mesne assignments, to SCM Corporation, New York, N.Y., a corporation of New York
No Drawing. Filed Jan. 25, 1965, Ser. No. 427,958
11 Claims. (Cl. 117—70)

ABSTRACT OF THE DISCLOSURE

Titania nucleated, porcelain enamel frit compositions containing specified critical amounts of silica, titania, boric oxide, soda, potash, fluorine, and phosphorous pentoxide (with or without additional modifying ingredients) are nucleated through a specified heat-treating process.

This nucleated frit is adapted for dry-process enameling of ground-coated, cast iron substrates to produce tough, adherent, bright, mottle-free enamel top-coats thereon.

---

This invention relates to the dry-process enameling of cast-iron articles with nucleated $TiO_2$-containing frit, thereby to obtain finished articles whose enamel coatings are thinner than heretofore, are free of the mottling which has generally characterized dry-process $TiO_2$ enamels in the past, and to obtain finished articles from which slight surface defects can be removed by grinding and polishing without visible sign of such removal.

Application of porcelain enamel coatings to massive cast iron sanitary-ware, such as bathtubs, lavatories, etc., is usually accomplished by a process known as "dry-process" or "dredging" wherein a finely ground porcelain enamel frit is sprinkled through a screen onto a very hot cast iron until sufficient glass is present to yield a heavy, opaque, protective coating after additional heating of the coated cast iron. Two, three, or more powder applications are required to develop adequate opacity and coverage in the glass coating. Currently available materials of commerce for this use are glasses opacified by the addition of antimony compounds such as the oxide or sodium antimonate. Other materials for opacification of such frits are well known in the prior art and include zirconium, tin, and zinc compounds. Titanium dioxide has been used to impart acid resistance to these glasses but seldom has been used to impart opacity because of the mottled appearance produced in the finished enamel layer.

Our invention relates to the use in dry-process enameling of a novel nucleated frit which on dry-process application yields anatase $TiO_2$ as the predominant opacifier thereby to permit the use of enamel layers having up to or less than one-half of the usual thickness of coatings now in commercial use, yet having superior opacity and coverage as well as the ability to meet all other end use requirements of such coatings including acid resistance, color, smooth glossy surfaces, correct coefficient of expansion, the ability to be fired at usual temperatures, and very stable color and surfaces through a wide range of time and temperatures. Furthermore, a single coating (i.e., dredging operation) is sufficient to provide satisfactory porcelain enamel thickness with respect to opacity and with respect to all other end use properties because of the very superior index of refraction of enamels having high anatase/rutile ratios in comparison with the index of refraction of other opacifiers which have been used heretofore.

We have discovered that to secure the described qualities in enamel layers opacified with titanium dioxide, the frit must be carefully heat-treated prior to the dredging operation so as to properly nucleate it.

Accordingly, it is an object of this invention to provide a novel process for nucleating $TiO_2$-containing frits so as to prepare them for dry-process enameling of cast-iron bodies.

It is a further object to provide a novel process for preparing an enameling $TiO_2$-frit for dry-process use so as to ensure crystallization of $TiO_2$ predominantly in the anatase form.

It is another object to provide a ground-coated cast iron article which has a clean, white-colored enamel top-coat containing $TiO_2$ and characterized by having a major part of its $TiO_2$ in the anatase form.

These and related objects will be understood from the foregoing and following description of the invention.

Titanium dioxide has been used widely as an opacifier in porcelain enamels for so called wet-process application to sheet steel since the close of the second world war, but until recently has never been used successfully on cast iron sanitaryware. During the firing of existing wet process porcelain enamel frits on sheet steel by heating slowly from room temperature to about 1450–1550° F., titanium dioxide crystallizes as anatase and is a pure bluish-white opacifier. When these same frits are applied by dredging to hot (preheated) ground-coated cast iron, as is the custom in the enameling of santitaryware, the very rapid heating so secured causes crystallization of both the anatase and the rutile forms of titanium dioxide, yielding a mottled, non-uniform white. The coating has poor color stability over a small range of temperature, tends to change color when heated for various times, and is completely unsatisfactory as a protective coating.

We are aware of British Patent No. 966,451 published Aug. 12, 1964, which describes dry-process enameling of cast iron by using nucleated $TiO_2$-opacified frit, but have found by extensive testing that the frits of the present invention fail to yield unmottled enamels when nucleated below the fusion temperature and otherwise manipulated in accordance with the teachings of said patent. Accordingly, the present invention is directed largely to the discoveries we have made in learning how to nucleate our frits so as to secure results analogous to those sought in said British patent.

Example I

The present invention can best be understood and appreciated by considering a specific (and preferred) example. Table I, below, represents a typical formulation of starting materials which can be used to prepare a frit of the invention. Table II, below, represents a typical analysis of the resulting frit, as expressed in terms of its ultimate elements and metal oxides.

TABLE I

| | Pounds |
|---|---|
| Silica | 35.4 |
| Borax | 10.5 |
| Boric acid | 10.3 |
| Soda ash | 1.2 |
| Lithium carbonate | 2.6 |
| Potassium carbonate | 5.6 |
| Potassium nitrate | 3.2 |
| Litharge | 2.0 |
| Titanium dioxide | 17.3 |
| Potassium fluosilicate | 7.4 |
| Sodium triphosphate | 4.5 |

TABLE II

| | Wt. percent |
|---|---|
| $SiO_2$ | 42.0 |
| $TiO_2$ | 19.4 |
| $B_2O_3$ | 14.8 |

TABLE II—Continued

| | Wt. percent |
|---|---|
| $Na_2O$ | 6.4 |
| $K_2O$ | 9.2 |
| $Li_2O$ | 1.2 |
| PbO | 2.2 |
| $P_2O_5$ | 2.7 |
| Fluorine | 2.1 |

To prepare the frit of Table II, the starting materials shown in Table I are ground or otherwise comminuted to a powdery condition (usually −200 mesh or finer). The comminution can be effected in any suitable manner either by treating each starting material individually, or by treating the whole mixture of starting materials as a unit. In either case, the comminuted materials are brought to a powdery state in which all components have been thoroughly mixed together. The resulting mixture is then smelted at about 2200° F. so as to form a homogeneous molten glassy mass. The glassy mass is then quenched rapidly from its molten state by running it through the nip of water-cooled rolls, or by pouring it in a small stream directly into water. The quenching solidifies the mass and causes it to shatter into small fragments, and in this state is the frit whose composition is shown in Table II.

The frit is next dried, if wet, and then is either (a) milled to appropriate fineness for application by the dredging process to ground-coated cast iron of any of the known analyses used in sanitaryware, or (b) left in its granular or flake frit form resulting from the quenching. In either case the frit, after a subsequent nucleation treatment described next below, must be milled to correct fineness (as well known in the art) before final use in the dredging process.

Either the powder (a) or coarse frit (b) is then exposed to a nucleating process which consists of spreading the frit in reasonably thin layers, (e.g., from 1/16 to 3 inches in thickness) on a suitable inert surface and then heating the entire mass to temperatures between about 925° F. and 1050° F. (preferably about 950° F.) for a critical length of time ranging from 30 minutes to 4 hours. (Preferably for 2 hours at 950° F.). During this period of heat-treatment, nuclei of titanium dioxide form in the glass mostly in the anatase crystal form, and although invisible to the eye can be detected by X-ray diffraction analysis. The amount of titania so crystallized in small nuclei is usually only a fraction of a percent of the total amount present (i.e., enough to be detectable by X-ray analysis), but of course can be at higher levels, e.g., up to 10% or more.

After the heat-treatment has been accomplished, the hot, nucleated frit can be quenched in water or otherwise cooled to room temperature in a short period of time. If the frit is then already fine enough for direct use in the dredging process, when dry, it can be stored for subsequent application to hot ground-coated cast iron. If the frit is too coarse for such direct use, then it is further comminuted in any suitable manner.

The nucleated frit, in suitably dry and powdered form, is then applied to hot cast iron sanitaryware which has been precoated when cold with a suitable ground coat well known to those skilled in the art. The application by dredging (through a screen of about 40 mesh) is conducted in such a manner as to apply an even coating to the hot ground-coated iron whereby to secure a final coating which is preferably about 0.015" thick. However, the thickness can vary from 0.005 to 0.075" without involving change in the properties of the glass coating. A single coating thinner than about 0.010 inch will not have sufficient hiding power to completely obscure the cast iron substrate; so where such thin coats are applied, the thickness should be built up by applying two or more coats in succession with fusion of each being accomplished before the next is applied. The practice in this respect follows the long common practices in dry-process enameling, but as will be noted, the present invention can secure complete hiding with enamel coats of .015" whereas thicknesses averaging .035–.045" have been required conventionally.

The final product of this dry-process enameling operation by the method and materials of our invention is a tough, adherent, bright, clean white glass coating on ground-coated cast iron sanitaryware, and is free of mottling. Only one coating about .015" thick is required, but if for any reason a thicker glass is desired, multiple coatings can be applied without adversely affecting the final result. When such a glass coating is measured for color values by use of the Color Difference Meter it exhibits typical values as follows:

| | Percent (Reflectance) |
|---|---|
| $R_d$ | 85.0 |
| a | −0.7 |
| b | +2.5 |

By X-ray diffraction analysis of the finished enamel it is found that the anatase/rutile ratio is about 2.5 to 1.

It will be understood that color adjustments are possible by adding coloring pigments (so-called ceramic stains) to the milled and nucleated frit prior to dredging. Molybdenum thioxide can also be added to any of the frit formulations of the invention in amounts up to about 1% by weight, whereby to secure a bluish tinge in the finished enamel coating. Color values can also be shifted small amounts by minor changes in the ratio of ingredients in the formulation.

Example II

Nucleated frit yielding results comparable with those of the frit of Example I, can be prepared in like manner (a) by omitting some or all of the lithium oxide of Example I, (b) by omitting some or all of the PbO, (c) by omitting some or all of both lithium oxide and PbO, (d) by adding individually or in any combination Up to 10% of $Al_2O_3$
Up to 3% of ZnO
Up to 8% of $ZrO_2$ said percentages being by weight, based on the total weight of frit shown in Table II.

By way of recapitulation, it will be recognized that when the frit analysis of Table II is re-calculated to include the omissions and/or additions of Examples I and II, the scope of the frit analysis applicable to the present invention is as follows, when the amounts of selected ingredients total 100%:

TABLE III

| | Wt. percent |
|---|---|
| $SiO_2$ | 34.4–43.5 |
| $TiO_2$ | 15.9–20.0 |
| $B_2O_3$ | 12.1–15.3 |
| $Na_2O$ | 5.2–6.6 |
| $K_2O$ | 7.5–9.6 |
| $Li_2O$ | 0–1.20 |
| PbO | 0–2.20 |
| $P_2O_5$ | 2.2–2.80 |
| Fluorine | 1.7–2.2 |
| $Al_2O_3$ | 0–10.00 |
| ZnO | 0–3.00 |
| $ZrO_2$ | 0–8.00 |
| $MoO_3$ | 0–1.00 |

The British patent referred to hereinabove discloses compositions which are closely similar to the compositions of the present invention and the temperatures of nucleating heat treatments are expressed in terms of softening-point of the glasses. According to the patent, the heat-treating temperature is between 100° and 400° F. above the softening point. The heat-treating times are stated to be from one minute to 25 minutes. The particular glass composition given in the patent on 3 thereof is stated to have an interferometer softening point of 959° F. Thus, according to the teachings of the patent, this composition should be heat-treatable at temperatures between 1059° F. and 1359° F. for times of 1–25 minutes.

When the preferred composition of the present invention as set forth in Table II, is treated under the conditions of said British patent, it produces a mottled enamel which is wholly unsatisfactory in appearance. In order to nucleate it by heat-treatment so that the fired enamel on a ground-coated cast-iron body exhibits the desired uniform clean white color, we found it necessary to both reduce the temperature and extend the time. In a series of tests wherein the frit was heat-treated at various temperatures and times and then was fired on ground-coated cast-iron by heating the dry-process-coated iron for 1.5 minutes at 1600° F., it was found that the sought clean, white, mottle-free color was secured only by combinations of temperature and time which produced a fired enamel having a reflectance of 83% or more. The following table summarizes the tests:

TABLE IV.—REFLECTANCE

| Time | 925° F. | 975° F. | 1,000° F. | 1,050° F. |
|---|---|---|---|---|
| | percent | percent | percent | percent |
| 30 minutes | 80 | 82.3 | 83.6 | 84.4 |
| 1 hour | 82 | 84.5 | 84.0 | 86.1 |
| 2 hours | 85 | 87.9 | 86.2 | 87.0 |
| 3 hours | 84.5 | 85.6 | 86.6 | 87.7 |
| 4 hours | 83.8 | | | |

Since the softening point of the frit of Table II is 995° F., it will be seen that the temperatures which are satisfactory for our frits for our purposes can be expressed as being within about 70° F. above or below the softening point, and hence are considerably below the temperature of 995° F. plus 100° F. which the British patent teaches as being the minimum appropriate heat-treating temperature. Moreover, it will be seen that at a temperature of 925° F., our composition must be heat-treated for somewhat more than 1 hour in order to give a mottle-free fired enamel (i.e., in order to give a fired enamel having a reflectance of at least 83%). Reflectances between 82% and 83% were found to correspond to fired enamel coating which were slightly (but still objectionably) mottled. Thus it will be clear that the heat-treating times and temperatures are highly critical and are entirely outside the ranges taught by said British patent. Similarly critical results were found with other compositions falling within the ranges of composition given in Table III.

It will be understood that the nucleating heat-treatment of the frits of the invention can be carried out in various ways, e.g., in a rotary-hearth furnace, in pans or trays which pass through a heating zone having controlled temperature, in temperature-controlled fluidized-bed equipment, in convection type ovens where the circulated air is of controlled temperature and is forcibly circulated around a static or slowly moving layer of the frit, or in various other types of heat-treating equipment designed for exposing particulate material to heating media having controlled temperature. The time of exposure at a selected temperature depends on factors described above but in general the time varies inversely with temperature. This isbecause the crystallization of the $TiO_2$ from solution in the glass is a slower operation at low temperatures than at higher temperatures.

The nucleated frits of the invention, besides yielding the sought mottle-free fired enamel coatings, also exhibit a highly desirable quality not heretofore encountered in dry-process enamels. This is the quality of being easy to repair. In the firing of dry-processed cast-iron articles, the fuels employed give rise to fine blackish particles which are suspended in the atmosphere around the work. These particles frequently settle on the molten enamel of the article and produce obviously-objectionable defects in the otherwise clean, white color of the finished article. In the past, efforts to grind the specks out of the surface of titanium-opacified dry process enamels have been unsuccessful because the resulting ground spot has been almost as unsightly as the speck itself. Efforts to polish the ground spot did not relieve the situation. However, the nucleated frits of the invention somehow give fired enamels which can easily be polished after grinding out the specks, so that the enamel gives no visible evidence that spots therein have been ground and polished.

Another advantage of the nucleated frits of the invention is that the fired enamels, when cold, are found to be under considerable compression force due to the differences between the coefficients of expansion of the fired enamel and of the groundcoated cast iron. This compression of the enamel coating makes the coating considerably resistant to cracking or spalling when subjected to impact.

It will be understood that the compositions of the frits of the invention are determined by usual analytical methods using samples of either the frits or of the fired enamels secured by dry-process application of the nucleated frits on ground-coated cast iron articles. It will also be understood that X-ray diffraction analyses for anatase/rutile ratios and measurements of reflectances are carried out on samples of the fired enamels secured by dry-process application of the nucleated frits on ground-coated cast iron articles after being fired for 1.5 minutes at 1600° F. to fuse the dredged frits to the substrate. It will also be understood that the fired enamels of the invention are characterized by exhibiting anatase/rutile ratios of at least 2.5 to 1 and by reflectances of at least 83%.

What we claim is:

1. In the process of preparing a nucleated porcelain enamel frit adapted for use in the dry-process enameling of a ground-coated cast iron substrate, the improvement which comprises the steps of:

(A) preparing a comminuted frit composed essentially of: 34.4–43.5 wt. percent of silica, 15.9–20.0 wt. percent of titanium dioxide, 12.1–15.3 wt. percent of boric oxide, 5.2–6.6 wt. percent of sodium oxide, 7.5–9.6 wt. percent of potassium oxide, 2.2–2.8 wt. percent of phosphorous pentoxide, 1.7–2.2 wt. percent of fluorine, 0–1.20 wt. percent lithium oxide, 0–2.2 wt. percent of lead monoxide, 0–10 wt. percent of aluminum oxide, 0–3 wt. percent of ZnO, 0–8.0 wt. percent of $ZrO_2$, and 0–1 percent of $MoO_3$; and (B) heat-treating said comminuted frit at temperatures between about 925° F. and 1050° F. for a time of 30 minutes to about four hours whereby said frit is rendered capable of forming a dry-processed, titania opacified, enamel having an anatase/rutile ratio of at least 2.5 to 1.

2. The process as claimed in claim 1, wherein said heat-treatment of the frit is carried out with said comminuted frit spread out in a layer having a thickness between about 1/16" and 3".

3. The process as claimed in claim 2 wherein said comminuted frit is composed essentially of:

| | Wt. percent |
|---|---|
| $SiO_2$ | 42 |
| $TiO_2$ | 19.4 |
| $B_2O_3$ | 14.8 |
| $Na_2O$ | 6.4 |
| $K_2O$ | 9.2 |
| $Li_2O$ | 1.2 |
| PbO | 2.2 |
| $P_2O_5$ | 2.7 |
| Fluorine | 2.1 |

4. The process as claimed in claim 3 wherein said heat-treatment is carried out for about two hours at about 950° F.

5. The process as claimed in claim 4 wherein said heat-treated frit is subsequently ground to a fineness suitable for dry-process use.

6. The process as claimed in claim 1 wherein said heat-treated frit is subsequently ground to a fineness suitable for dry-process use.

7. Nucleated frit prepared by the process of claim 1.
8. Nucleated frit prepared by the process of claim 4.
9. A ground-coated cast iron article having a white opaque topcoat enamel (a) whose thickness is between about .010″ and .075″, (b) which is characterized by having an anatase/rutile ratio of at least 2.5 to 1 and a reflectance of at least 83%, and (c) which consists essentially of the following materials, in weight percent: 34.4–43.5% $SiO_2$, 15.9–20.0% $TiO_2$, 12.1–15.3% $B^2O^3$, 5.2–6.6% $Na_2O$, 7.5–9.6% $K_2O$, 22–2.8% $P_2O_5$, 1.7–2.2% fluorine, 0–1.2% $Li_2O$, 0–2.2% PbO, 0–10% $Al_2O_3$, 0–3% ZnO, 0–8% $ZrO_2$ and 0–1.0% $MoO_3$.

10. An enameled cast-iron article as claimed in claim 9 wherein the white enamel top coat consists essentially of the following materials, in weight percent:

| | Wt. percent |
|---|---|
| $SiO_2$ | 42 |
| $TiO_2$ | 19.4 |
| $B_2O_3$ | 14.8 |
| $Na_2O$ | 6.4 |
| $K_2O$ | 9.2 |
| $Li_2O$ | 1.2 |
| PbO | 2.2 |
| $P_2O_5$ | 2.7 |
| Fluorine | 2.1 |

11. A method for preparing a tough, adherent, mottle-free, enamel coating on a ground-coated, cast iron substrate, which method comprises; applying to said substrate a comminuted nucleated frit composed essentially of: 34.4–43.5 wt. percent of silica, 15.9–20.0 wt. percent of titanium dioxide, 12.1–15.3 wt. percent of boric oxide, 5.2–6.6 wt. percent of sodium oxide, 7.5–9.6 wt. percent of potassium oxide, 2.2–2.8 wt. percent of phosphorous pentoxide, 1.7–2.2 wt. percent of fluorine, 0–1.20 wt. percent of lithium oxide, 0–2.20 wt. percent of lead monoxide, 0–10 wt. percent of aluminum oxide, 0–3 wt. percent of ZnO, 0–8.0 wt. percent of $ZrO_2$, and 0–1.0 percent of $MoO_3$; said frit having been nucleated by heat-treating at temperatures between about 925° F. and 1050° F. for a time of 30 minutes to about 4 hours, and maintaining said substrate at an elevated temperature for a time sufficient to fuse said frit into a titania opacified, enamel top coat having an anatase/rutile ratio of at least 2.5 to 1.

References Cited

UNITED STATES PATENTS

| | | |
|---|---|---|
| 2,920,971 | 1/1960 | Stookey. |
| 3,216,847 | 11/1965 | Armant _____ 117—129 X |
| 3,278,284 | 10/1966 | Van Dolah et al. |

FOREIGN PATENTS

| | | |
|---|---|---|
| 254,901 | 10/1964 | Australia. |
| 966,451 | 8/1964 | Great Britian. |

RALPH S. KENDALL, *Primary Examiner.*